United States Patent
Mueller

(10) Patent No.: US 7,245,633 B1
(45) Date of Patent: Jul. 17, 2007

(54) MULTIPLEXING METHOD FOR GIGABIT ETHERNET SIGNALS IN THE SYNCHRONOUS DIGITAL HIERARCHY

(75) Inventor: Horst Mueller, Hohenschaeftlarn (DE)

(73) Assignee: Siemens Aktiengesellschaft, Munich (DE)

( * ) Notice: Subject to any disclaimer, the term of this patent is extended or adjusted under 35 U.S.C. 154(b) by 1009 days.

(21) Appl. No.: 10/148,454

(22) PCT Filed: Nov. 10, 2000

(86) PCT No.: PCT/DE00/03937

§ 371 (c)(1), (2), (4) Date: May 29, 2002

(87) PCT Pub. No.: WO01/41339

PCT Pub. Date: Jun. 7, 2001

(30) Foreign Application Priority Data

Nov. 29, 1999  (DE) .............................. 199 57 301

(51) Int. Cl.
*H04J 3/316* (2006.01)
*H04J 3/22* (2006.01)
*H04J 3/02* (2006.01)

(52) U.S. Cl. .................. 370/466; 370/469; 370/539

(58) Field of Classification Search ................ 370/539, 370/466, 469, 401
See application file for complete search history.

(56) References Cited

U.S. PATENT DOCUMENTS

| 5,457,691 | A | * | 10/1995 | Romeijn ..................... 370/510 |
| 6,075,796 | A | * | 6/2000 | Katseff et al. ............... 370/466 |
| 6,636,529 | B1 | * | 10/2003 | Goodman et al. .......... 370/469 |
| 6,836,791 | B1 | * | 12/2004 | Levi et al. ................... 709/217 |
| 6,956,852 | B1 | * | 10/2005 | Bechtolsheim et al. ..... 370/389 |

FOREIGN PATENT DOCUMENTS

| EP | 0 656 704 A1 | 6/1995 |
| EP | 0 944 290 | 9/1999 |
| EP | 0 982 969 | 3/2000 |
| WO | WO 00/74286 | 12/2000 |

* cited by examiner

*Primary Examiner*—Chi Pham
*Assistant Examiner*—Ronald Abelson
(74) *Attorney, Agent, or Firm*—Bell, Boyd & Lloyd LLP

(57) ABSTRACT

A multiplexing method for Ethernet signals in the synchronous digital hierarchy, wherein the bit rate of a Gigabit Ethernet signal is reduced at the transmission end via 10B/8B decoding such that, after marking control words and data words which are to be transmitted in packets, the packets can be inserted in an STM-N signal.

8 Claims, 5 Drawing Sheets

MULTIPLEXING METHOD FOR GIGABIT ETHERNET SIGNALS IN THE SYNCHRONOUS DIGITAL HIERARCHY

BACKGROUND OF THE INVENTION

Data terminals such as routers or switches have an interface for local applications, such as for a local area network, which interface is referred to in IEEE Draft Recommendation P802.3z as the 1000BASE-X interface, and which is known in the literature as the Gigabit Ethernet interface. However, this interface has only a very restricted range of a few hundred meters. If one wishes to physically extend local area networks or form MAN or WAN networks, then these Gigabit Ethernet signals must be transported via transmission networks. Normally, in Europe, these transmission networks make use of transmission systems which operate on the basis of the synchronous digital hierarchy SDH in accordance with ITU Recommendation G.707. In the USA, these systems operate on the basis of the SONET Standard, which is likewise defined in G.707.

An object of the present invention is to specify a circuit arrangement and a method in which Ethernet signals can be inserted in SDH/SONET systems.

SUMMARY OF THE INVENTION

The present invention results in the advantage that two or eight Gigabit Ethernet signals can be accommodated in one STM-16 or STM-64 signal, respectively.

The present invention results in the advantage that only the lowest layer (physical layer) of the protocol stack of the Gigabit Ethernet signal need be processed, but not the higher layers (layers 2 to 7). This results in the advantage that the method can be implemented relatively easily.

Additional features and advantages of the present invention are described in, and will be apparent from, the following Detailed Descriptions of the Invention and the Figures.

DETAILED DESCRIPTION OF THE INVENTION

Gigabit Ethernet signals use a bit rate of 1.25 Gbit/s. The bit rates defined in G.707 for STM-16 signals are 2.488320 Gbit/s, and those for STM-64 signals are 9.953280 Gbit/s.

For economical utilization of the transmission capacity, two Gigabit Ethernet signals are inserted in one STM-16 signal, and up to eight Gigabit Ethernet signals are inserted in one STM-64 signal and/or are mixed with other specific SDH signals in an STM-N signal (N=16, 64, 256, . . . ).

The method according to the present invention describes one possible way in which the bit rate of a Gigabit Ethernet signal can be reduced in a suitable way to satisfy the above requirement.

The Gigabit Ethernet signal has a nominal bit rate of 1 Gbit/s, but, in accordance with IEEE Draft P802.3z, is subjected to 8B/10B coding, as a result of which the bit rate is increased from 1 Gbit/s to 1.25 Gbit/s in order to ensure that there are as many signal transitions as possible and that the signal has no direct-current level. This, in turn, allows simpler regeneration of the signal and clock recovery at the reception end. For transmission within an STM-N signal, a scrambler can be used instead of 8B/10B coding, which likewise ensures sufficiently frequent signal transitions. The 8B/10B coding is described in Tables 36-1a to 1e and in Table 36-2 in IEEE Draft Recommendation P802.3z. Table 36-1 is in this case provided for the data information, and Table 36-2 for control information.

The method according to the present invention now provides for 10B/8B decoding to be carried out and for one bit to be attached to the decoded 8-bit code word, depending on whether this is data information or control information. A data word is identified, for example, by a bit with the logic value "1", and a control word is identified by a bit with the logic value "0". The 8B/10B coding is, in this way, converted to 8B/9B coding, as a result of which the bit rate of the Gigabit Ethernet signal is reduced from 1.25 Gbit/s to 1.125 Gbit/s. This results in the advantage that two or eight Gigabit Ethernet signals can be accommodated in an STM-16 or STM-64 signal, respectively.

Figure 1:
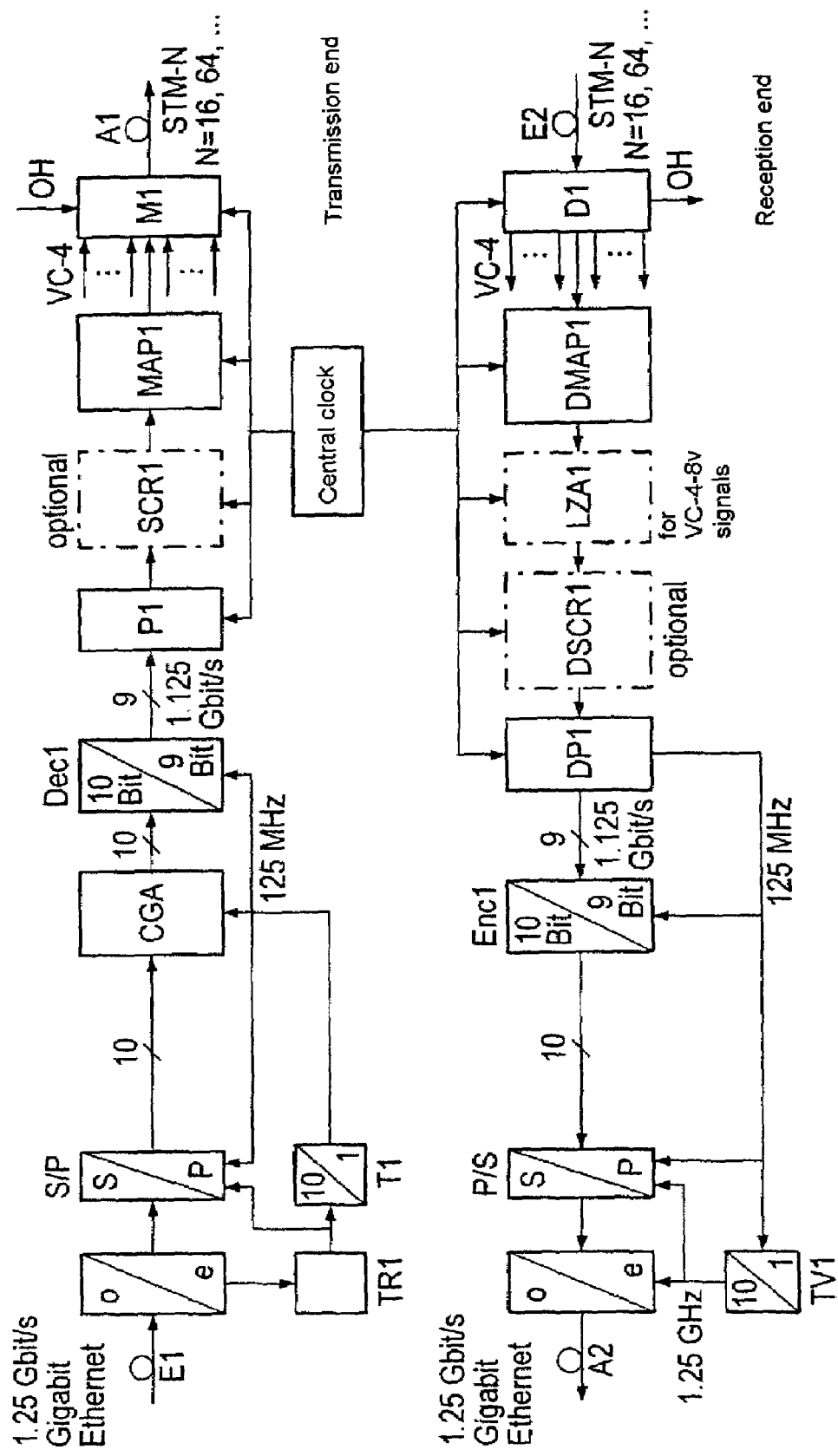
FIG. 1 shows a multiplexing method for a Gigabit Ethernet signal in an STM-N signal.

The upper part of FIG. 1 shows the transmission end, and the lower part of FIG. 1 shows the reception end, of an SDH/SONET system for STM-N signals (N=16, 64, 256, . . . ). The optical Gigabit Ethernet signal arriving at the input E1 is converted from optical to electrical form, and a 1.25 GHz clock is recovered from the data signal in a clock recovery circuit TR 1. This clock is used to read the electrically converted input signal into a serial/parallel converter S/P. The 1.25 GHz clock is divided by a factor of 10 in a clock divider T 1. The resultant 125 MHz clock is used to read the data signal on 10 parallel lines from the serial/parallel converter S/P. The 10-bit words are identified in a code group alignment circuit CGA, and are supplied to a decoder Dec 1 in a form such that the MSB (most significant bit) is in each case transmitted on the first line, and the LSB (least significant bit) is transmitted on the tenth line. As described initially, 10B/8B decoding is carried out in the decoder Dec 1, and a bit which identifies whether this is data information or control information is added to the 8B code word. The signal, whose bit rate has thus been reduced to 1.125 Gbit/s, is supplied on nine parallel lines to a packetizer P1, with the MSB being transmitted on the first line, the LSB being transmitted on the eighth line, and the flag which identifies whether this is data or control information being transmitted on the ninth line.

The packetizer P1 has the task of combining a number of these 9-bit words to form packets, which are mapped in a further step into eight contiguously or virtually concatenated VC-4 signals. The contiguous and virtual concatenation is described in paragraph 8.1.7 of Recommendation G.707 and is used for the transmission of signals which have a broader bandwidth than a VC-4 signal (149.760 Mbit/s). The principle of virtual concatenation is also described in Patent Specification EP 0 429 888 B1. For the described method, it is irrelevant whether contiguous or virtual concatenation is used, since the only difference between the two concatenation methods is the pointer processing, with the payload being precisely the same in both methods. The method according to the present invention describes how this payload can be used for the transmission of Gigabit Ethernet signals.

Figure 2:
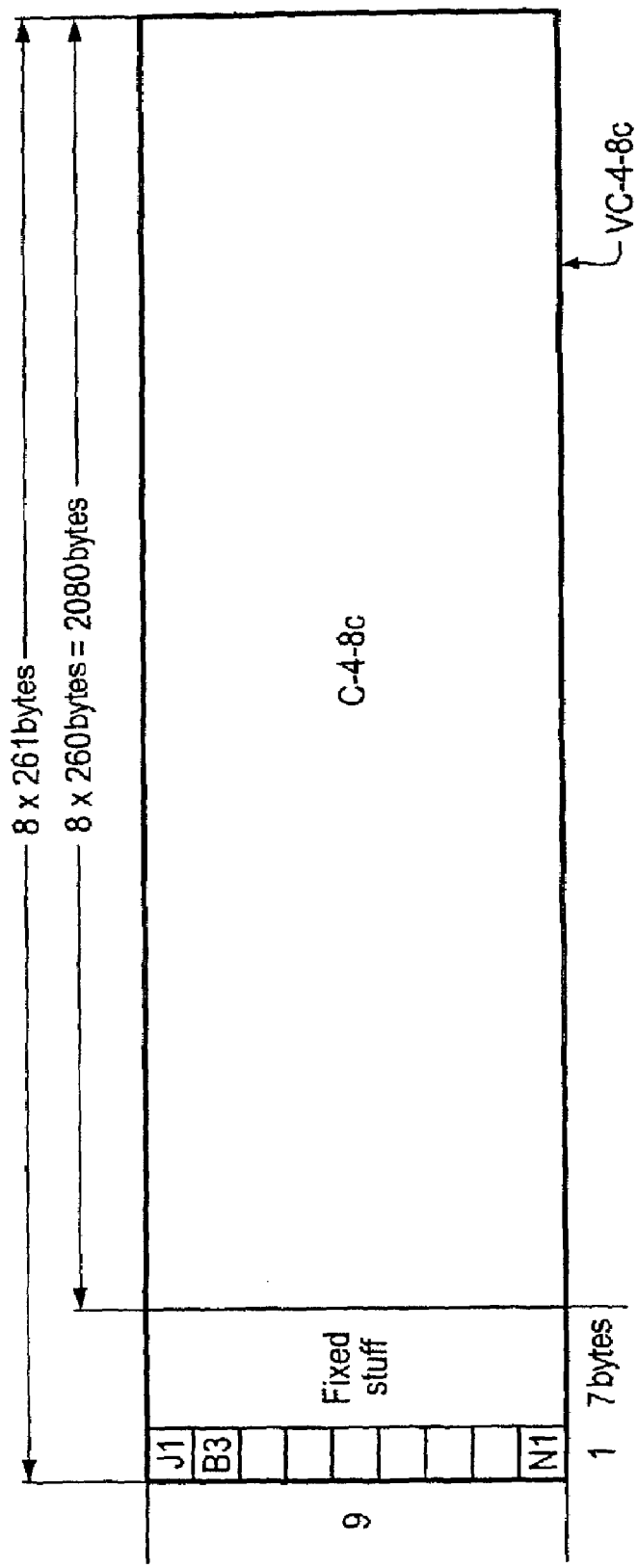
FIG. 2 shows a structure of a VC-4-8c signal.

FIGS. 8-8 in Recommendation G.707 illustrates VC-4-Xc concatenation in general form. Now, by way of example, FIG. 2 shows the concatenation of eight VC-4 signals to form a VC-4-8c signal in which a 1.125 Gbit/s signal can be accommodated. A common path overhead POH for the VC-4-8c signal is transmitted in a first column of the VC-4-8c signal, starting with the byte J1. This is followed by 7 columns which are filled with fixed stuff FS. In the case of virtual concatenation, no common POH is formed for the VC-4-8v signal and each of the concatenated VC-4 signals is instead given its own POH, which is then transmitted in the first column and the seven columns which are annotated with fixed stuff. This is followed by the region for the payload information with 8×260 bytes corresponding to 2080 bytes per row, and hence 2080×9=18 720 bytes per frame. If the frame frequency is 8 kHz, the capacity of this payload is thus:

18 720 bytes×8×8 kHz=1.198 080 Gbit/s.

The following text now describes how a 1.125 Gbit/s signal can be accommodated in this payload of 1.198 080 Gbit/s. Since the frequency of the Gigabit Ethernet signal is generally not synchronized to the frequency of the STM-N signal and is hence not synchronized to the payload either, a packetizing method with filling (padding) should be used for frequency matching.

Figure 3:
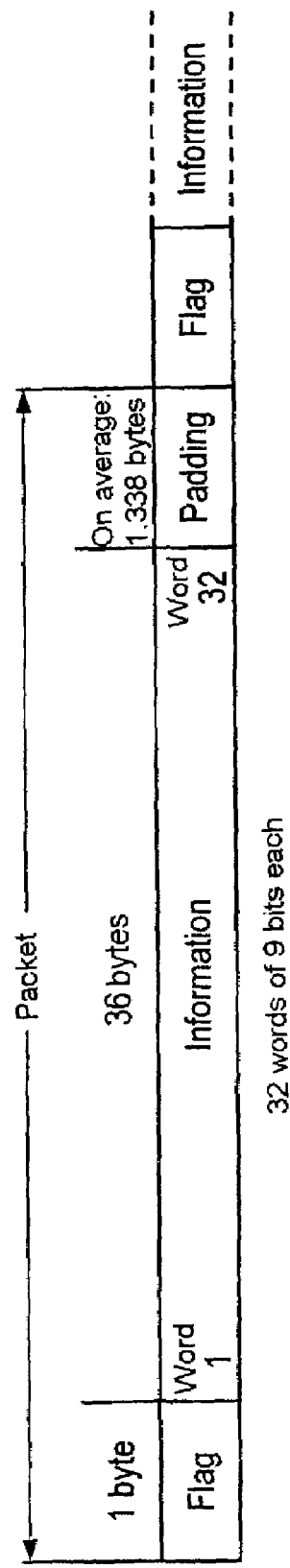
FIG. 3 shows a packet structure.

As illustrated in FIG. 3, the start of a packet should be identified by a flag (with a length of 1 byte), followed by n data words of 9 bits (information) each, and then followed by a specific number of padding bytes for frequency matching.

In this case:
(Flag+Information+Padding)/Information=1198 080 Gbit/s/1.125 Gbit/s=1.06496. Furthermore, the information field should be divisible by 9 (9-bit words) and should have a length of m bytes, in order for the 9-bit structure of the data to be maintained on the transmission route. By way of example, the information field is chosen to have a length of 36 bytes. 32 words of 9 bits each are then accommodated in the information field, with the MSB of the first word following the flag.

In this case:
(Flag+Information+Padding)/Information=1+36+Padding/36=1.06496 and hence:
Padding=36×1.06496−(1+36)=1.33856.

Thus, on average, 1.33856 padding bytes are transmitted; that is to say, one padding byte is attached to each packet in approximately one third of the cases, and two padding bytes are attached to each packet in two thirds of the cases. A packet thus has a length of 38 or 39 bytes, depending on the length of the padding. The flag byte and the padding byte should have as great a Hamming distance from one another as possible, in order to ensure that the start of a packet can be identified reliably.

Packets of constant length, having 1 flag byte and 36 information bytes, for example, likewise also can be formed. Empty packets are sent for frequency matching, containing 36 bytes of empty information instead of the 36 bytes of information. Two different flag bytes, which have as great a Hamming distance from one another as possible, are used to distinguish between the empty packets and the information packets. However, the second method has the disadvantage that a relatively large buffer store must be provided for temporary storage of the information, and the complexity for suppressing the jitter in the Gigabit Ethernet signals at the output A2 is significantly greater.

The output signal from the packetizer P1 may, optionally, be scrambled in a scrambler SCR 1, if the 7-stage scrambler which is provided in a downstream multiplexer M1 in accordance with Recommendation G.707 is not regarded as being adequate. In the mapper MAP 1, the output signal from the scrambler is packed either into eight immediately successive (contiguous) concatenated VC-4-8c signals, or virtually concatenated VC-4-8v signals. Finally, the output signal from this mapper has other VC-4 signals jointly added to it in a multiplexer M1, with the addition of SDH-specific overhead information OH to form an STM-N signal (N=16, 64, 256, . . . ) A1. The packetizer, scrambler, mapper and multiplexer are supplied with the necessary clocks from a central clock.

At the reception end, the overhead information OH is first of all removed from the STM-N signal, and the individual VC-4 signals are recovered, in a demultiplexer D1. In a demapper, the 1.198 080 Gbit/s payload signal is recovered from the contiguously or virtually concatenated VC-4-8c/VC-4-8v signal, analogously to the situation in the transmission direction. In the case of virtual concatenation, as described in more detail in Patent Specification EP 0 429 888 B1, different delay times of the concatenated VC-4 signals must, in this case, be compensated for in suitable buffer stores for delay-time compensation LZA 1. If the payload signal has been scrambled at the transmission end, this must be reversed in a descrambler DSCR 1. This is followed by the depacketizer DP 1, which identifies and removes the flag information and padding information, and recovers the data signal at the original bit rate of 1.125 Gbit/s. The demultiplexer, demapper, delay-time compensation, descrambler and depacketizer are supplied with the necessary clocks from the central clock.

A downstream encoder Enc 1 uses the ninth bit to determine whether the information is data information or control information, and forms the 1.25 Gbit/s signal using the 8B/10B coding method defined in IEEE Draft P802.3z. The signal, which arrives on 10 parallel lines, is converted in a parallel/serial converter PS to a serial 1.25 Gbit/s Gigabit Ethernet signal and, after electrical/optical conversion, is emitted at the output A2. The depacketizer DP 1 produces a 125 MHz clock, which is supplied to a frequency multiplier TV 1, which uses it to produce a 1.25 GHz clock for the serial output signal A2.

Figure 4:
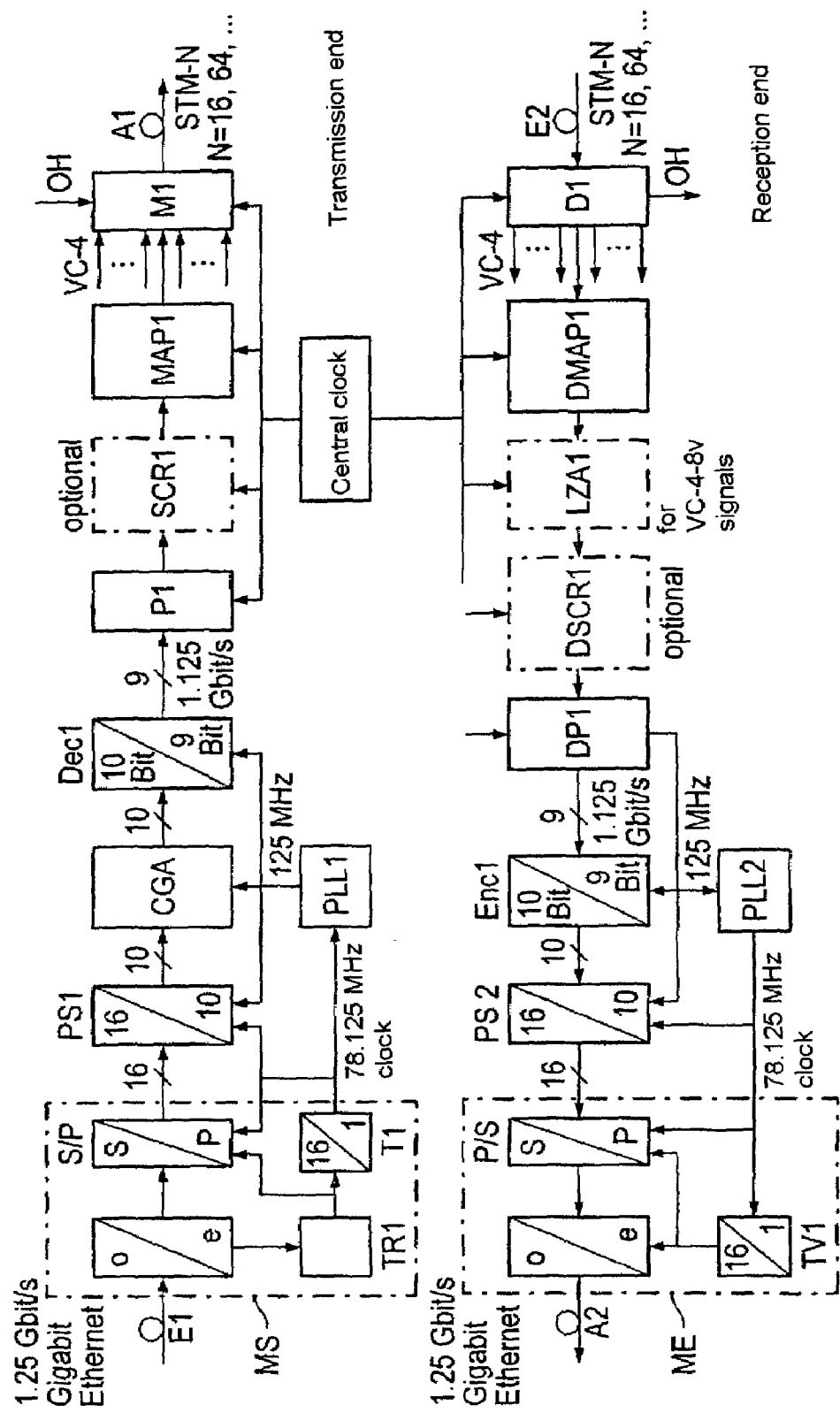
FIG. 4 shows a further multiplexing method for a Gigabit Ethernet signal in an STM-N signal.

FIG. 4 shows a variant of the embodiment of the multiplexing method for a Gigabit Ethernet signal in an STM-N signal. Commercially available modules are used for this refinement. The module MS used at the transmission end includes the optical/electrical transducer, the clock recovery device TR 1, a clock divider with a factor of 16, and a serial/parallel converter S/P, to which the electrically converted input signal is written using the 1.25 GHz clock, and which is read using the 78.125 MHz clock divided down by the factor 16.

In addition, and in comparison to the method illustrated in FIG. 1, a buffer store PS 1 and a Phase locked loop circuit PLL 1 are now required, but these operate at a lower bit rate so that they can be implemented using CMOS. The 78.125 MHz clock is supplied to the Phase locked loop circuit PLL 1, which uses this to produce a 125 MHz clock (division ratio 10:16). The serial/parallel-converted data signal is written in the buffer store PS 1 on 16 parallel lines using the 78.125 MHz clock, and is read on 10 parallel lines using the 125 MHz clock. The rest of the processing corresponds to that in FIG. 1.

The module ME used at the reception end contains the optical/electrical transducer, a frequency multiplier TV 1 with a multiplication factor of 16, and a parallel/serial converter P/S. In addition, and in comparison to the method illustrated in FIG. 1, a buffer store PS 2 and a Phase locked loop circuit PLL 2 are also required here. The PLL 2 circuit uses the 125 MHz clock to produce a 78.125 MHz clock. The signal emitted from the encoder Enc 1 on 10 parallel lines is written to the buffer store PS 2 using the 125 MHz clock, and is read on 16 parallel lines using the 78.125 MHz clock. The rest of the functions correspond to FIG. 1.

Figure 5:
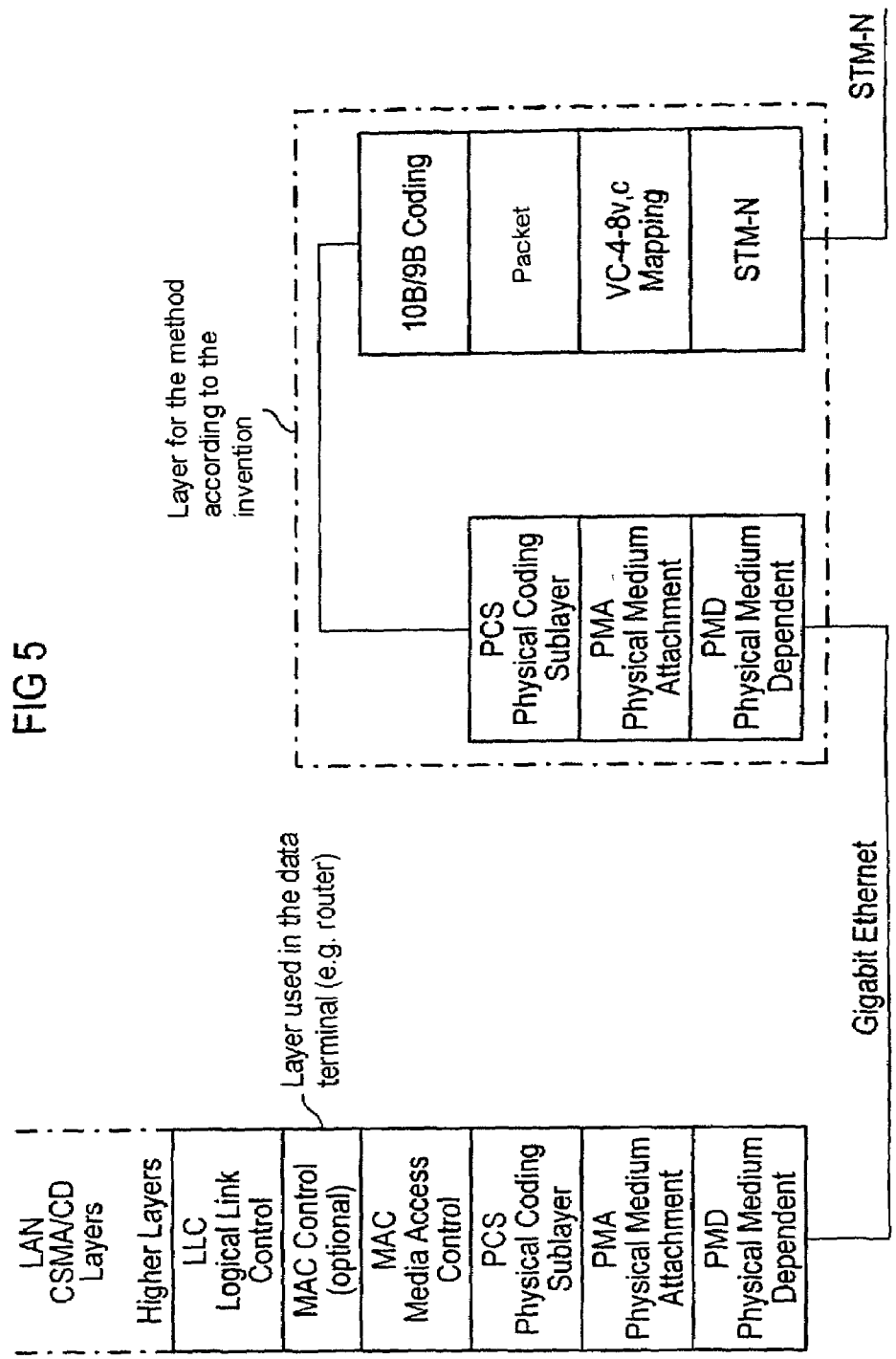
FIG. 5 shows an illustration of a protocol stack.

FIG. 5 shows a protocol stack which is used in a data terminal (for example, a router) and in the SDH appliance according to the present invention. A more detailed explanation of the individual layers is given in IEEE Draft Recommendation P802.3z.

Although the present invention has been described with references to the specific embodiments, those of skill in the art will recognize that changes may be made thereto without departing from the spirit and scope of the present invention as set forth in the hereafter appended claims.

The invention claimed is:

1. A system for inserting Ethernet signals into STM-N signals in a synchronous digital hierarchy, comprising:
   parts for serial/parallel conversion of the Ethernet signals;
   a decoder which receives the converted Ethernet signals word-by-word, carries out 10B/8B decoding of the Ethernet signals and marks control data and payload data; and
   a packetizer following the decoder, wherein the packetizer:
      combines a bit stream emitted from the decoder to form packets,
      combines the packets to form VC-4 signals,
      marks a start of a packet by a flag byte and adds a padding byte at an end of the packet, and
      arranges information data between the flag byte and the padding byte, with a number of words of payload data arranged in an information field being divisible by 9, and including a length of m bytes.

2. A system for inserting Ethernet signals into STM-N signals in a synchronous digital hierarchy as claimed in claim 1, wherein a logic value can be attached to the control data and payload data in the decoder.

3. A system for inserting Ethernet signals into STM-N signals in a synchronous digital hierarchy as claimed in claim 1, further comprising:
   a mapper for packing an output signal from the packetizer into eight signals, the signals being one of immediately successive signals and virtually concatenated signals; and
   a multiplexer for attaching SDH-specific overhead information to an STM-N signal.

4. A system for forming Ethernet signals from an STM-N signal in a synchronous digital hierarchy, comprising:
   a demultiplexer for separating overhead information from the STM-N signal;
   a demapper for recovering a payload signal;
   a depacketizer for identifying and separating flag and padding information, with payload data being produced at an output of the depacketizer at a bit rate as specified for STM-N signals; and
   an encoder for forming a bit rate which is specified for Ethernet signals using 9B/10B coding.

5. A method for inserting Ethernet signals in an STM-N signal in a synchronous digital hierarchy, the method comprising the steps of:
   serial/parallel converting the Ethernet signals;
   supplying the Ethernet signals word-by-word to a decoder;
   10B/8B decoding of the Ethernet signals; and
   marking both control data and payload data;
   arranging a flag byte at a start of a packet; and
   arranging a padding byte at an end of the packet; and
   arranging information data between the flag byte and the padding byte, with a number of words in an information field arranged between the flag byte and the padding byte being divisible by 9 and having a length of m bytes.

6. A method for inserting Ethernet signals in an STM-N signal in a synchronous digital hierarchy as claimed in claim 5, the method further comprising the steps of:
   combining a decoded bit stream at an output of the decoder into packets; and
   combining the packets to form VC-4 signals.

7. A method for forming Ethernet signals from an STM-N signal in a synchronous digital hierarchy, the method comprising the steps of:
   separating overhead information from the STM-N signal; and
   matching a bit rate from payload data in the STM-N signal to a bit rate which corresponds to a bit rate of Ethernet signals, via 9B/10B coding.

8. A system for inserting Ethernet signals into STM-N signals in a synchronous digital hierarchy, comprising:
   parts for serial/parallel conversion of the Ethernet signals;
   a decoder which receives the converted Ethernet signals word-by-word, carries out 10B/8B decoding of the Ethernet signals and marks control data and payload data;
   a packetizer following the decoder, wherein the packetizer:
      combines a bit stream emitted from the decoder to form packets,
      combines the packets in a subsequent step to form VC-4 signals,
      marks a start of a packet by a flag byte and adds a padding byte at an end of the packet;
   a mapper for packing an output signal from the packetizer into eight signals, the signals being one of immediately successive signals and virtually concatenated signals; and
   a multiplexer for attaching SDH-specific overhead information to an STM-N signal.

* * * * *